United States Patent [19]

Rech

[11] 4,082,130
[45] Apr. 4, 1978

[54] FASTENING MEANS

[75] Inventor: Jakob Rech, Detroit, Mich.

[73] Assignees: Sheldon H. Applefield; Jerome H. Applefield, both of Southfield, Mich.; part interest to each

[21] Appl. No.: 753,517

[22] Filed: Dec. 22, 1976

Related U.S. Application Data

[63] Continuation-in-part of Ser. No. 692,888, Jun. 4, 1976, abandoned.

[51] Int. Cl.² .................... F16B 19/00; F16B 39/06
[52] U.S. Cl. ............................... 151/23; 85/7; 85/61
[58] Field of Search ............ 151/23, 26, 8; 85/7, 85/1 SS, 61

[56] References Cited

U.S. PATENT DOCUMENTS

| | | | |
|---|---|---|---|
| 641,241 | 1/1900 | Sherwood | 151/8 X |
| 902,169 | 10/1908 | Richards | 85/1 SS X |
| 1,393,260 | 10/1921 | Carr | 85/1 SS X |
| 1,623,365 | 4/1927 | Smith | 151/8 |
| 1,829,881 | 11/1931 | Tucker | 151/8 X |
| 1,857,139 | 5/1932 | Carlton | 151/39 X |
| 3,117,486 | 1/1964 | Matthews | 85/61 X |
| 3,963,322 | 6/1976 | Gryctko | 85/61 X |

Primary Examiner—Ramon S. Britts
Attorney, Agent, or Firm—Hauke & Patalidis

[57] ABSTRACT

A fastener consisting essentially of a male member and a female member having a bore engageable over the male member, and a threaded member threadable in a partially threaded bore having an axis substantially parallel to the longitudinal axis of the male member, a portion of the partially threaded bore, for example one half, being threaded and formed in the male member and another portion being unthreaded and formed in the female member. Rotating the threaded member in one direction causes the female member to be displaced longitudinally relative to the male member to a desired position. The present invention can be used as an alternative to nuts and bolts for mechanical assemblies, by providing the male member with an enlarged head, or it may be used for mounting arms, pulleys, gears, cams and the like on a shaft.

11 Claims, 8 Drawing Figures

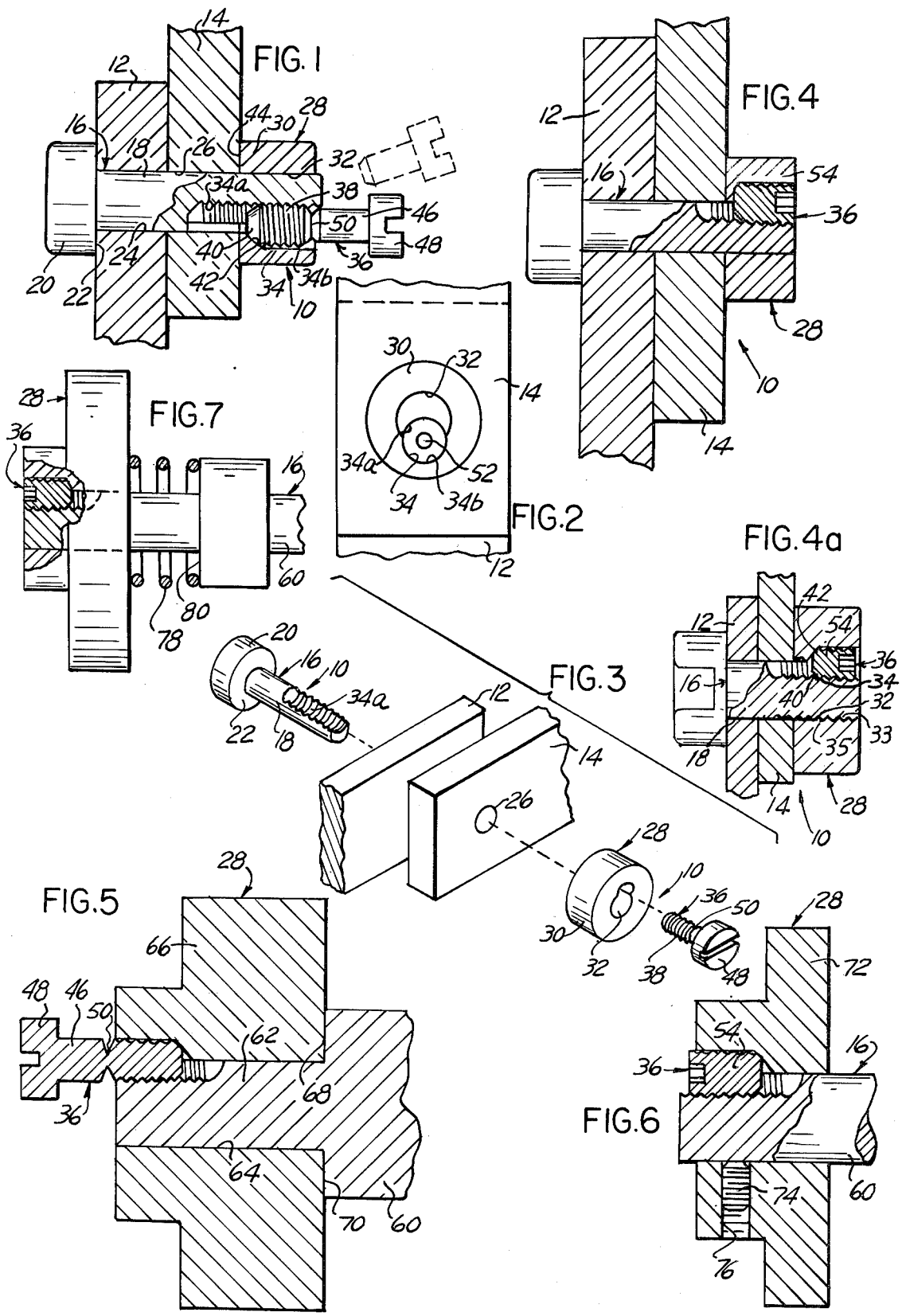

FASTENING MEANS

CROSS-REFERENCE TO RELATED APPLICATION

The present application is a continuation-in-part of application Ser. No. 692,888, filed June 4, 1976 now abandoned.

BACKGROUND OF THE INVENTION

Mechanical assemblies are generally made by way of fasteners, such as screws, nuts and bolts, rivets and the like, which are used for holding together the diverse parts forming the mechanical assembly. A problem generally associated with conventional fasteners is that they are generally weaker than the parts held in assembly, they do not permit to control with precision the amount of mutual pressure exerted by the mechanical parts being joined or the amount of torquing of a bolt or a nut, they often require some auxiliary locking devices or "safeties" in assemblies subjected to stress or vibrations which may loosen the fastener, and are subject to other inconveniences and failures, all well known to those skilled in the art of fasteners.

Another problem associated with conventional fasteners such as screws, nuts and bolts, even when provided with auxiliary locking devices, is that they can easily be unfastened or removed by unauthorized persons. Such is the case with respect to fasteners holding access cover plates to mechanical, electronic or electrical devices, or to instruments, meters and the like, where it is desired to protect from inspection or interference with by unauthorized persons. Another example of assemblies generally using conventional fasteners which are desirable to be protected from interference by unauthorized persons, are locks, doors and window hinges, such that the mounting screws for locks and hinges are usually disposed on the inside of a building such as to be inaccessible from the outside. It is not, however, always possible to mount door hinges on the inside, as is the case when doors must open towards the outside of the building because of fire regulations.

The shortcomings and inconveniences of conventional fasteners are remedied by the present invention which provides fastening means which permit to hold parts in assembly with any degree of pre-load or pressure desired, which are not subject to loosening as a result of variable loads or vibrations being applied to the assembled parts and which, according to an aspect of the invention, prevent unauthorized disassembly or removal of the parts by means of ordinary tools.

SUMMARY OF THE PRESENT INVENTION

The present invention accomplishes its objects by providing means for assembling together a male member in the form of a stud, shaft end or the like and a female member, held together by means of a threaded member disposed in a threaded bore formed partly in a longitudinally axed peripheral recess in the male member and a corresponding unthreaded recess in the wall of the bore of the female member. The female member may take the form of a retainer element being the equivalent of a nut, the male member being provided with an enlarged head so as to form the equivalent of a bolt, such that mechanical parts may be held in assembly over the male member with any desirable amount of pressure applied by the female retainer in the direction of the enlarged head of the male member. The male member may take the form of a shaft, or the like, and the female member may take the form of a bearing, a bearing race, a bearing retainer, a pulley, a gear, a cam or the like which it is desired to fasten in a predetermined location on the shaft.

BRIEF DESCRIPTION OF THE DRAWING

The many objects and advantages of the present invention will become apparent to those skilled in the art when the following description of the best modes contemplated for practicing the invention is read in conjunction with the accompanying drawing wherein like reference numerals refer to like or equivalent elements and in which:

FIG. 1 represents a partial longitudinal section through a fastener according to the present invention used for holding mechanical parts in assembly;

FIG. 2 is an end view of the assembly of FIG. 1;

FIG. 3 is an exploded view of the mechanical assembly of FIG. 1;

FIG. 4 is a view similar to FIG. 1, but showing a modification of the present invention;

FIG. 4a is a partial sectional view of an assembly similar to that of FIG. 4 but showing a further modification of the present invention;

FIG. 5 is a sectional view illustrating another modification of the present invention;

FIG. 6 is a sectional view of a further modification of the invention; and

FIG. 7 is a partial sectional view of a modification of the arrangement of FIG. 6.

DETAILED DESCRIPTION OF THE PREFERRED EMBODIMENTS

Referring now to the drawing and more particularly to FIGS. 1-3 thereof, a fastener 10 according to the present invention is illustrated holding in assembly a pair of mechanical parts, 12 and 14. The fastener 10 comprises a male member 16 in the form of a circularly cylindrical stud or body 18 provided on one end with an enlarged head 20 defining a shoulder abutting surface 22. The male member cylindrical body 18 is passed through aligned mounting apertures 24 and 26 disposed respectively in part 12 and part 14.

The fastener 10 further comprises a female member 28 in the form of a retainer 30, shaped as a sleeve or bushing, provided with a circularly cylindrical bore 32 adapted to slidably but snuggly fit over the end of the cylindrical body 18 of the male member 16. A cylindrical partially threaded bore 34, having its axis substantially parallel to the longitudinal axis of the male member 16 and consequently to the longitudinal axis of the female member bore 32, is formed such as to extend diametrically tranversely partly into the end of the body 18 of the male member 16 and partly into the side wall of the bore 32 of the retainer 30. The partially threaded bore 34 preferably extends diametrically or transversely approximately one half into a recess formed in the side of the cylindrical body 18 of the male member 16 which is threaded, as shown at 34a. The bore 34 extends diametrically or transversely approximately one half into a recess 34b in the side wall of the retainer bore 32. The recess 34b is provided with a relatively smooth surface and extends from one end face of the female member or retainer 28 to only part of the way to the other face, as illustrated in the drawing. The half bores 34a and 34b thus define the partially threaded full bore 34 for the purpose of receiving therein a threaded male member 36. The threaded member 36 has an end portion 38 provided with a peripheral thread corresponding to the thread of the threaded partial bore 34a and a preferably tapered, or alternatively rounded, end 40 engageable with a correspondingly tapered, or rounded, abutment 42 disposed at the bottom of the partial smooth bore 34b. Consequently, when the threaded member 36 is rotated in the appropriate direction feeding it into the threaded partial bore 34a, as a result of the end 40 engaging the corresponding abutment 42 in the partial bore 34b of the female member 28, the end face 44 of the female retainer 30 is caused to engage the surface of the part 14, thereby clamping and holding the parts 14 and 12 in assembly between the shoulder portion 22 of the male member enlarged head 20 and the end face 44 of the retainer 30. As shown best at FIGS. 1 and 3, the threaded partial bore 34a in the body 18 of the male member 16 has a length appreciably greater than the length of the unthreaded partial bore 34b in the wall of the bore 32 of the retainer 30 such as to extend longitudinally of a distance appropriate to provide sufficient longitudinal travel of the retainer 30 relative to the male member 16 to provide diverse thicknesses of assemblies to be held together by means of fasteners 10 according to the present invention, within a size range.

In the example illustrated at FIGS. 1-3 the threaded member 36 is in the form of a screw having a reduced diameter body portion 46 proximate its enlarged head 48, a relatively deep groove 50 being formed at the junction between the threaded portion 28 and the reduced diameter body portion 46, such that when the female retainer 30 is fastened on the end of the bolt-like male member body 18 with sufficient preload to hold the assembled parts 12 and 14 in position, the reduced diameter portion 46 of the threaded member 36 may be broken off, as shown in phantom line, such that there remains in the partially threaded bore 34 only the threaded end portion 28. The assembly is therefore secure, and it is impossible to disassemble the parts, except with the aid of special tools, especially if the threaded member 36 is made of an appropriately hardened steel, for example, thus preventing drilling of the threaded stud 52, FIG. 2, remaining wedged in the bore 34 after the head portion 46-48 of the threaded member 36 has been broken off.

The assembly illustrated at FIG. 4 is identical to the assembly of FIG. 1 with the exception that the breakaway threaded member 36 has been replaced by a threaded member in the form of a set screw 54 provided with a square or hexagonal drive pocket 56 accessible by an appropriate wrench, such that the assembly can be taken apart at will.

FIG. 5 illustrates the principle of the invention adapted to, for example, mounting a female part 28 which may take any appropriate form such as a cam 66, or bearing, a bearing race, a gear, a wheel, or the like, on the end of a male member 16, which is in the form of a shaft 60 provided with a reduced diameter portion 62 disposed within a bore 64 of the cam 66. Between the shaft 60 and the reduced diameter end portion 62 thereof there is formed a shoulder 68 against which an end face 70 of the cam 66 is caused to abut when the threaded member 36 is rotated. The threaded member 36 is shown, for illustrative purposes, to be a breakaway screw-like member, such that when the head 48 and body portions 50 thereof are broken away, the assembly cannot be taken apart without the use of special tools, as precedently explained. If it is desired to provide an assembly which may be taken apart, an ordinary screw or bolt, or a set screw, may be used instead of the break-way threaded member 36.

FIG. 6 illustrates an example of a modification of the invention for mounting a female member 28 in the form of a cam, wheel, pulley, or a gear, on a male member 16 in the form of a shaft 60. The female member, in the example illustrated, is for example, a gear 72. The threaded member 26 is in the form of a set screw 54 and, by rotation of the set screw 54, the longitudinal position of the gear 72 along the shaft 60 may be determined with high precision. Once the appropriate position of the gear 72 is achieved, one or more set screws such as set screw 74 disposed in a radical threaded bore 76, are tightened with their end in engagement with the peripheral surface of the shaft 60 so as to immobilize the gear 72 in its predetermined longitudinal position relative to the shaft 60.

It is evident that in the arrangement of FIG. 6 the threaded member 36 is capable of displacing the gear 72 relative to the shaft 60 in one direction only, from left to right, although the gear 72 may be displaced manually from right to left while backing the set screw 54. If it is desired to provide an arrangement whereby a female member is adjustably displaceable within a range in both directions along the longitudinal axis of a male member such as a shaft, an arrangement as illustrated at FIG. 7 may be used. In the arrangement of FIG. 7, the female member 28, such as a cam for example, is displaceable toward the right by means of the threaded member 36, compressing a coil spring for example, schematically illustrated at 78, disposed between the right end face of the female member 28 and a shoulder 80 on the shaft 60. When the threaded member 36 is rotated in an opposite direction, the female member 28 is displaced toward the left by the expanding spring 78.

Although the breakaway threaded member 36 has been illustrated and described as being provided with a screw-like slotted enlarged head, it will be appreciated that it may be provided with a square or hexagonal bolt head, with a Phillips screw type slotted head, or the like. It will be also appreciated that although the male member 16 and the female member 28 have been illustrated and described as being provided respectively with a smooth peripheral circularly cylindrical surface and a corresponding smooth cylindrical bore, they may take any appropriate shape such as being square or hexagonal in transverse section or they may be provided with appropriate threaded surfaces, in which case it is convenient to provide at least the female member 28 with appropriate driving means such as a square or hexagonal periphery, substantially as a conventional nut. Such an arrangement is illustrated at FIG. 4a wherein the female member 28 is in the form of a nut having its bore 32 provided with an internal thread 33 engaged with an external thread 35 formed at least at the end of the body 18 of the male member 16. The threaded member 36 is tightened in the partially threaded bore 34 after the female member, or nut 28 has been torqued in. The threaded member 36 acts as a locking means preventing the nut 28 from rotating relative to the male member body 18 and perhaps more importantly yet, the end 40 of the threaded member 36 engaging the abutment 42 at the bottom of the recess adjustably preloads the threads 33 and 35 and increases the holding force exerted by the bolt and nut fastener on the joined parts 12 and 14. The partially threaded bore 34 may be formed after the assembly is completed, or it may be pre-formed. In the latter case, unless amounts of torquing corresponding to full turns of the female member, or nut, 28 are suitable, it is preferable to provide partially threaded bores 34 disposed 180°, 90° or 60° apart to provide half-turn, quarter-turn, or one sixth-turn, respectively, of locking positions of the nut.

It will be further appreciated that although a single locking threaded member 36 has been illustrated and described, a plurality of such locking threaded members may be used with corresponding recesses or partial bores formed in the wall of a female member 28 and on the periphery of the body 18 of the male member 16.

Having thus described the present invention by way of typical practical applications and embodiments, modifications whereof will be apparent to those skilled in the art, what is claimed as new is as follows:

1. In combination, a female member and a male member including means for adjustably fastening said female member which is provided with a cylindrical first bore having a substantially smooth surface to said male member which is provided with a cylindrical body slidably engaged in said first bore, said means comprising a partially threaded circularly cylindrical second bore having an axis substantially parallel to the axis of said cylindrical body, said partially threaded second bore having an unthreaded portion extending transversely part of the way into said first bore surface and extending longitudinally from an end face of said female member to part of the way to the other end face of said female member and a threaded portion extending transversely part of the way into said male member body having a length appreciably greater than the length of said unthreaded bore portion, and a threaded member threadably engaged in said partially threaded second bore, said threaded member having an end engageable with abutment means defined by the end of said partially threaded second bore unthreaded portion, whereby rotation of said threaded member in the direction engaging the end thereof with said abutment means displaces said female member relative to said male member in one direction.

2. The means of claim 1 wherein the unthreaded portion of said partially threaded second bore extends transversely into said first bore surface of a distance substantially equal to the distance the threaded portion of said partially threaded second bore extends transversely into said male member body.

3. The means of claim 1 wherein said threaded member has an outwardly projecting end provided with tool driving means, a weakening peripheral groove being formed in said threaded member for breaking away said end provided with tool driving means.

4. The means of claim 1 wherein said threaded member is a set screw.

5. The means of claim 1 wherein said male member has an end provided with said threaded bore portion and another end provided with an enlarged head.

6. The means of claim 1 wherein said male member is a shaft.

7. The means of claim 6 wherein said female member is a mechanical part rigidly mounted on said shaft.

8. The means of claim 6 wherein said female member is a mechanical part supported by said shaft, said threaded member by engagement of said end thereof with said abutment means being adapted to displace said mechanical part longitudinally about said shaft in one direction.

9. The means of claim 8 further comprising biasing means for displacing said mechanical part in an opposite direction when said threaded member is rotated in an opposite direction.

10. The means of claim 8 further comprising abutment means formed on said shaft for limiting the longitudinal displacement of said mechanical part.

11. The means of claim 1 wherein said male member first body and said female member bore are circularly cylindrical.

* * * * *

UNITED STATES PATENT AND TRADEMARK OFFICE
CERTIFICATE OF CORRECTION

PATENT NO. : 4,082,130
DATED : April 4, 1978
INVENTOR(S) : Jakob Rech

It is certified that error appears in the above-identified patent and that said Letters Patent are hereby corrected as shown below:

Column 1, line 32, "where" should be --which--.

Column 2, line 54, should read --diametrically or transversely partly into the end of the body--.

Column 4, line 14, "radical" should be -- radial--.

Column 6, line 38, should read --body and said female member first bore are circularly--.

*Signed and Sealed this*

*Twenty-second* Day of *August 1978*

[SEAL]

Attest:

RUTH C. MASON
*Attesting Officer*

DONALD W. BANNER
*Commissioner of Patents and Trademarks*